United States Patent

[11] 3,628,915

[72] Inventor Louis A. Robertson
 Edgewood, Md.
[21] Appl. No. 838,806
[22] Filed July 3, 1969
[45] Patented Dec. 21, 1971
[73] Assignee The United States of America as
 represented by the Secretary of the Army

[54] CHEMICAL AGENT DETECTOR HOLDER AND METHOD OF TESTING AIR AND LIQUIDS FOR CHEMICAL AGENT CONTAMINATION
 6 Claims, 6 Drawing Figs.
[52] U.S. Cl.................................................. 23/230 R,
 23/232 R, 23/253 R, 23/253 TP, 23/254, 23/292
[51] Int. Cl...................................................... G01n 21/20,
 G01n 31/22
[50] Field of Search........................................... 23/230,
 232, 253, 253 TP, 254, 259, 292

[56] References Cited
 UNITED STATES PATENTS
3,480,400 11/1969 Csizmas et al. ............... 23/259

| | | | |
|---|---|---|---|
| 3,437,448 | 4/1969 | Miczka.......................... | 23/254 |
| 3,443,903 | 5/1969 | Haack et al..................... | 23/253 |
| 3,443,904 | 5/1969 | Hill.................................. | 23/253 |
| 3,466,145 | 9/1969 | Van Duyne..................... | 23/253 |

Primary Examiner—Morris O. Wolk
Assistant Examiner—Elliott A. Katz
Attorneys—Harry M. Saragovitz, Edward J. Kelly, Herbert Berl and Bernard J. Ohlendorf ABSTRACT: An apparatus means and method for detecting any chemical agent contamination within an air or water sample; the apparatus comprising a detector means located between a pair of block members with each block member adapted to move in respect to each other by means of arm members attached to each block member. One block member is held within the other by spring means located between the arm members, and a means is provided to draw an air sample through the apparatus.

PATENTED DEC 21 1971　　　　　　　　　　　　3,628,915
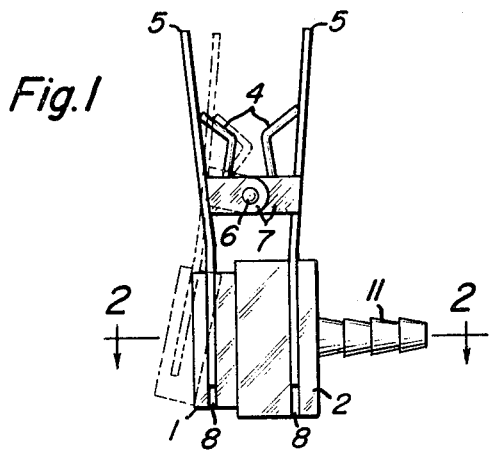
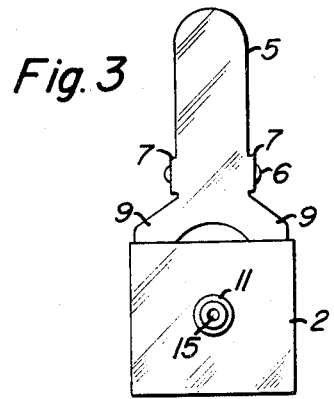
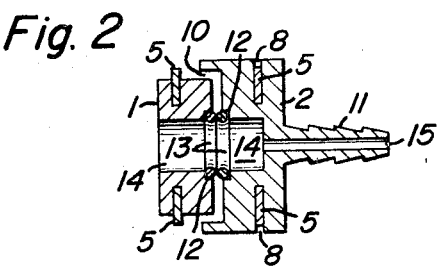
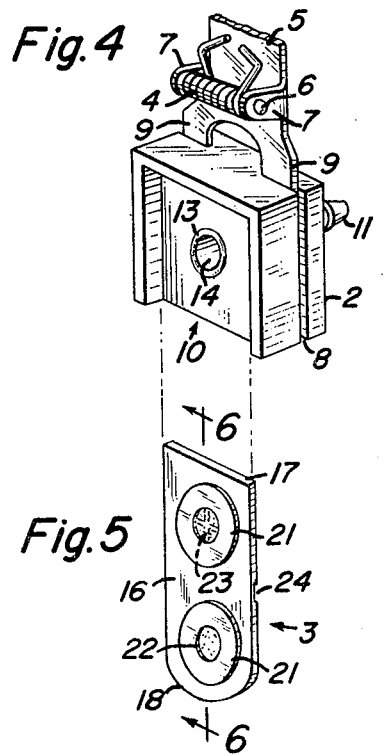
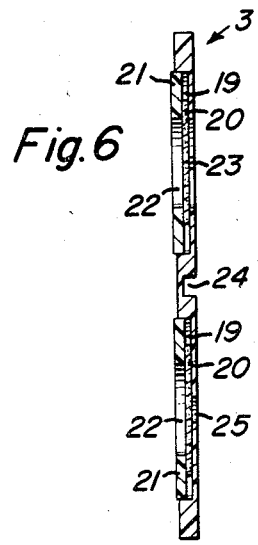
INVENTOR
Louis A. Robertson
Harry M. Saragovitz
Edward J. Kelly
Herbert Berl
Bernard J. Ohlendorf
BY　　　　ATTORNEYS

CHEMICAL AGENT DETECTOR HOLDER AND METHOD OF TESTING AIR AND LIQUIDS FOR CHEMICAL AGENT CONTAMINATION

The invention described herein may be manufactured, used, and licensed by or for the Government for governmental purposes without the payment to me of any royalty thereon.

My invention relates to a holder means for a chemical agent detector means and the method of testing air and liquids for chemical agent contamination by using my holder-detector combination.

A problem existed in the prior art for a compact and economical means and method to test air and liquids, such as water, for chemical agent contamination; particularly while wearing protective gloves. My invention was conceived and reduced to practice to solve the aforementioned problem and to satisfy the long felt need for a compact and economical means and method to test air and liquids for chemical agent contamination.

A principle object of my invention is to provide a reliable, compact, and economical means and method to test air and liquids, such as water, for chemical agent contamination; particularly while wearing protective gloves.

Other objects of my invention will be obvious or will appear from the specification hereinafter set forth.

FIG. 1 is a view of my holder apparatus without the detector means therein.

FIG. 2 is a view of a section taken along 2—2 of FIG. 1.

FIG. 3 is an end view of FIG. 1.

FIG. 4 is a partial isometric view of my holder means adapted to receive the detector means shown in FIG. 5.

FIG. 5 is a plan view of the detector means adapted to be used with the holder means shown in FIG. 4.

FIG. 6 is a section view of the detector means along 6—6 of FIG. 5.

My invention, as shown in FIGS. 1 to 6, will now be described in detail as follows.

Structures 1 and 2 are metal blocks, such as brass, utilized to clamp the detector means 3, as shown in FIGS. 5 and 6, therebetween. Blocks 1 and 2 are held in the closed position by spring tension imparted by conventional spring means 4 mounted between arms 5 and surrounding a fixedly mounted pin means 6; the pin means 6 joining arms 5 by insertion of the pin means 6 through a hole means in projections 7. Pin means 6 enables arms 5 to pivot about the pin means relative to each other by the application of pressure on arms 5 while the arms are held between the thumb and forefinger which in turn enables block 1 to be separated from block 2, as shown by the dotted lines in FIG. 1, to provide for the insertion or removal of detector means 3. Arms 5 are slidably mounted within a pair of slots 8 on opposite sides of blocks 1 and 2, as shown in FIGS. 1 and 4 in particular; the arms 5 being mounted in the slots 8 by means of extensions 9, as shown in FIG. 4 in particular. Block 2 contains a recess 10 in one surface and a tubular means 11 integral with the opposite surface; the surface area of the recess means 10 being slightly larger than the surface area of block 1 so that block 1 can loosely fit within recess 10. An annular recess 12 is provided in the center of one face of block 1 and within the surface generated by recess 10 of block 2. Conventional O-rings 13 are cemented within recesses 12 of blocks 1 and 2, and a hole means 14 of the same diameter as the inside diameter of recess 12 is provided through blocks 1 and 2. An orifice means 15 of tubular means 11 enters into hole means 14 of block 2 to permit passage of an air sample from recess 10. Detector means 3 has a plastic mount means 16 having a straight end 17 and a curved end 18 and annular recesses adjacent to each end adapted to contain discs impregnated with a predetermined conventional analytical chemical material to react with any chemical agents contaminating the air or liquids, such as water, to be tested; the chemical materials being designed to exhibit color changes which enable identification of the type and concentration of any contaminating chemical agent. As shown in FIG. 6, recesses 19 are provided in detector means 3 adjacent to either end, 17 and 18, to mount a conventional filter paper disc 20 in each recess 19; the discs 20 being held within recesses 19 by knockouts 21 held within recesses 19 by friction fit, and the knockout adjacent to the end 17 having a hole 25 to permit fluid flow through disc 20 and each knockout 21 having a hole means 22 centrally located therein to permit the sample medium, air or water for example, to contact detector discs 20 which are impregnated with a predetermined analytical chemical material. Recess 19 adjacent to end 17 is so located that the circumference of hole means 22 adjacent to end 17 will be superimposed on and coincide with the inside diameter circumference of O-rings 13 when the detector means is placed within recess 10 of block 2 and held within recess 10 by block 1 under the spring tension applied by spring means 4; the O-rings being utilized to prevent air sample leakage. A spider means 23 is located within recess means 19 adjacent to end 17 and integral with mount means 16 to prevent rupture or ejection of disc 20 from recess means 19 when an air sample is drawn through disc 20 by a vacuum means, not shown in the drawing, attached to tubular means 11. When placing detector means 3 within recess 10, the spider means 23 contacts O-ring 13 of block 2. Slot 24 is provided midway between ends 17 and 18 of detector means 3 to enable folding the detector means in half; slot 24 permitting the use of an unimpregnated disc in recess means 19 adjacent to end 18 to absorb a water sample and the folding of the detector means 3 in half to superimpose the unimpregnated disc 20 adjacent to end 18 over the disc 20 adjacent to end 17 which is impregnated with analytical chemical material to cause a chemical reaction between any chemical contaminating agent in the water sample absorbed in the unimpregnated disc adjacent to end 18 and the analytical chemical material absorbed in the disc adjacent to end 17 to produce a color change. The water sample, or other liquid to be tested, is absorbed in the above-described unimpregnated disc 20 by simply immersing the end 18 of detector means 3 so that disc 20 adjacent to end 18 is immersed in the liquid to be tested. To test an air sample for any chemical agent contamination, detector means 3 is placed between blocks 1 and 2, as described above, a conventional suction means, such as a squeeze bulb, not shown in the drawing, is attached to tubular means 11, and an air sample is drawn through disc 20 adjacent to end 17, which is impregnated with a predetermined conventional analytical chemical material and air with any contaminating agent removed is exhausted through orifice 15 by the suction means. Any color change produced in the disc 20, which is impregnated with the analytical chemical material is compared to a color chart for the particular analytical chemical material, in the conventional manner such as the spot analysis technique, to determine the particular chemical contaminating agent in the air or liquid sample and the concentration of the particular chemical contaminating agent. All conventional analytical chemical materials suitable for any particular application which can be impregnated in disc 20, which is conventional filter paper, can be utilized with my invention.

I wish it to be understood that I do not desire to be limited to the exact details of construction shown and described, for obvious modifications will occur to a person skilled in the art.

I claim:

1. An apparatus for detecting chemical agent contamination of air and water samples comprising a first and second block member, said block members being adapted to hold a detector means therebetween; air arm members attached to each block member adapted to move each block member relative to the other, said arm members being slidably mounted within slot means, the slot means being located in the side surfaces of the block members, and the side surfaces being in a plane perpendicular to the plane of the surface through which a hole means is formed in each block member; spring means located between the arm members adapted to hold the first block member within the second block member, said spring means being fixedly mounted between the arm members by placing it around a pin means which is fixedly mounted within hole means formed in two pairs of projection means which are integral with the arm means; and means to draw an air sample through the apparatus.

2. The apparatus of claim 1 wherein the detector means comprises a mount means having one end straight and the opposite end curved; a first annular recess located adjacent to the straight end, said first recess being adapted to contain a first filter paper disc impregnated with a predetermined analytical chemical material designed to react with and identify any contaminating chemical agent with the fluid being sampled; a first hole means centrally located within the first recess, the first hole means being adapted to permit fluid flow through to the first filter paper disc and being so located that the circumference of the said first hole means will be superimposed on and coincide with the inside diameter circumference of the O-ring mounted within the second block member when the detector means is inserted between the first and second block members; a spider means integral with the detector means and located within the first hole means, the spider means being adapted to prevent rupture and ejection of the first filter paper disc upon drawing a fluid sample through the apparatus and being located to be adjacent to the O-ring means within the second block member when the detector means is inserted between the first and second block members; a first filter paper disc means being impregnated with a predetermined analytical chemical material designed to react with and identify any contaminating chemical agent within the fluid being sampled, said first filter paper disc means being adapted to be contained within said first recess; a second annular recess located adjacent to the curved end, said second recess being adapted to contain a second filter paper disc to absorb a liquid sample; a pair of knockout discs having holes centrally located therein and being adapted to be friction fit within the first and second annular recesses and to retain the first and second filter paper discs within the respective recesses, said holes being adapted to permit fluid flow to and contact with the filter paper discs; and a slot means located midway between the straight and the curved ends. the slot means being adapted to permit the detector means to be folded in half.

3. The apparatus of claim 1 wherein the second block member has a first recess located in one surface to accommodate the first block member therein, the recess being of larger surface area than the first block member surface area; a hollow tubular means centrally located and integral with the second block member surface opposite to the surface containing the recess, the tubular means being adapted to connect to a suction means; a second recess located in the certer of the base surface of the first recess, said second recess being annular in configuration and adapted to accommodate an O-ring and the base surface being the surface generated as a result of the removal of material to form the first recess; a hole means extending from the second recess through the second block means to the tubular means, the hole means having a diameter which is equal to the inside diameter of the second recess through the second block means to the tubular means, the hole means having a diameter which is equal to the inside diameter of the second recess and larger than the orifice diameter of the tubular means, the hole means being adapted to provide fluid passage from the first recess through the hollow tubular means; and an O-ring means fixedly mounted within the second recess, the O-ring means being adapted to prevent fluid leakage when drawing a fluid sample through the apparatus for detection of any chemical agent contamination.

4. The apparatus of claim 3 wherein the first block member has an annular recess centrally located in one surface, said recess being of the same diameter as the second recess of the second block member and being adapted to accommodate an O-ring and to be aligned with the second recess of the second block member; a hole means extending through said first block member from said recess, the hole means being of the same diameter as the hole means in the second block member and opening to an outside environment to provide for drawing a fluid sample through the apparatus upon application of suction to the hollow tubular means; and an O-ring means fixedly mounted within said recess, the O-ring means being adapted to prevent fluid leakage when drawing a fluid sample through the apparatus for detection of any chemical agent contamination.

5. A method for detecting any chemical agent contamination in a fluid sample comprising the steps of separating a pair of spring tensioned blocks having a pair of arms attached thereto and the second of said blocks having an O-ring the separating being effected by releasing the spring tension on the blocks through the application of finger pressure on the pair of arms by squeezing the arms between the thumb and the forefinger, inserting a detector means, said detector means having a filter paper disc impregnated with an analytical chemical material and said detector means also having a first hole means, between the pair of blocks, aligning the detector means so that the first hole means is aligned with the second block member O-Ring, releasing the finger pressure on the arm means to permit the block members to close and to maintain the detector means between the block members, applying suction to a hollow tubular means centrally located and integral with the second block member surface opposite the surface which is formed to accommodate the first block member, drawing a fluid sample through the apparatus, reacting any chemical contaminating agent within the fluid sample with the analytical chemical material to produce a color change, removing the detector means from between the block members by squeezing the arms between the fingers, comparing any color changes in the first filter paper disc with a standard analytical color chart to determine the type and concentration of any chemical contaminating agent within the fluid sample.

6. The method of claim 5 wherein the fluid is air.

* * * * *